United States Patent [19]

Chan et al.

[11] Patent Number: 5,408,895
[45] Date of Patent: Apr. 25, 1995

[54] GEAR BUTT WARNING

[75] Inventors: Kwok W. Chan, Chorley; Anthony Stasik, Coppull; Robert S. Wheeler; Keith Wright, both of Preston, all of England

[73] Assignee: Eaton Corporation, Cleveland, Ohio

[21] Appl. No.: 165,207

[22] Filed: Dec. 13, 1993

[30] Foreign Application Priority Data

Jan. 23, 1993 [GB] United Kingdom ............... 9301294

[51] Int. Cl.⁶ ............................................. F16H 59/00
[52] U.S. Cl. ................................ 74/335; 74/336 R; 74/745; 477/97
[58] Field of Search ...................... 74/335, 745, 336 R, 74/DIG. 7; 477/77, 80, 97

[56] References Cited

U.S. PATENT DOCUMENTS

| | | | |
|---|---|---|---|
| 4,608,873 | 9/1986 | Redzinski | 74/336 R |
| 4,945,484 | 7/1990 | Cote et al. | 477/906 |
| 5,053,961 | 10/1991 | Genise | 74/336 R |
| 5,099,711 | 3/1992 | Langbo et al. | 74/335 |
| 5,191,814 | 3/1993 | Ando et al. | 477/906 |

Primary Examiner—Charles A. Marmor
Assistant Examiner—Peter Kwon
Attorney, Agent, or Firm—Howard D. Gordon

[57] ABSTRACT

A control method/system is provided for controlling start from stop shifting operations of a vehicular semi-automatic transmission system (10) of the type automatically implementing selected gear changes of a mechanical change gear transmission (12) and requiring manual operation (3) of the vehicle master clutch (16) in start from stop conditions is provided. During engagement of a selected start ratio, the system controller (38) monitors for gear butt conditions and will warn the operator if such conditions are sensed.

18 Claims, 5 Drawing Sheets

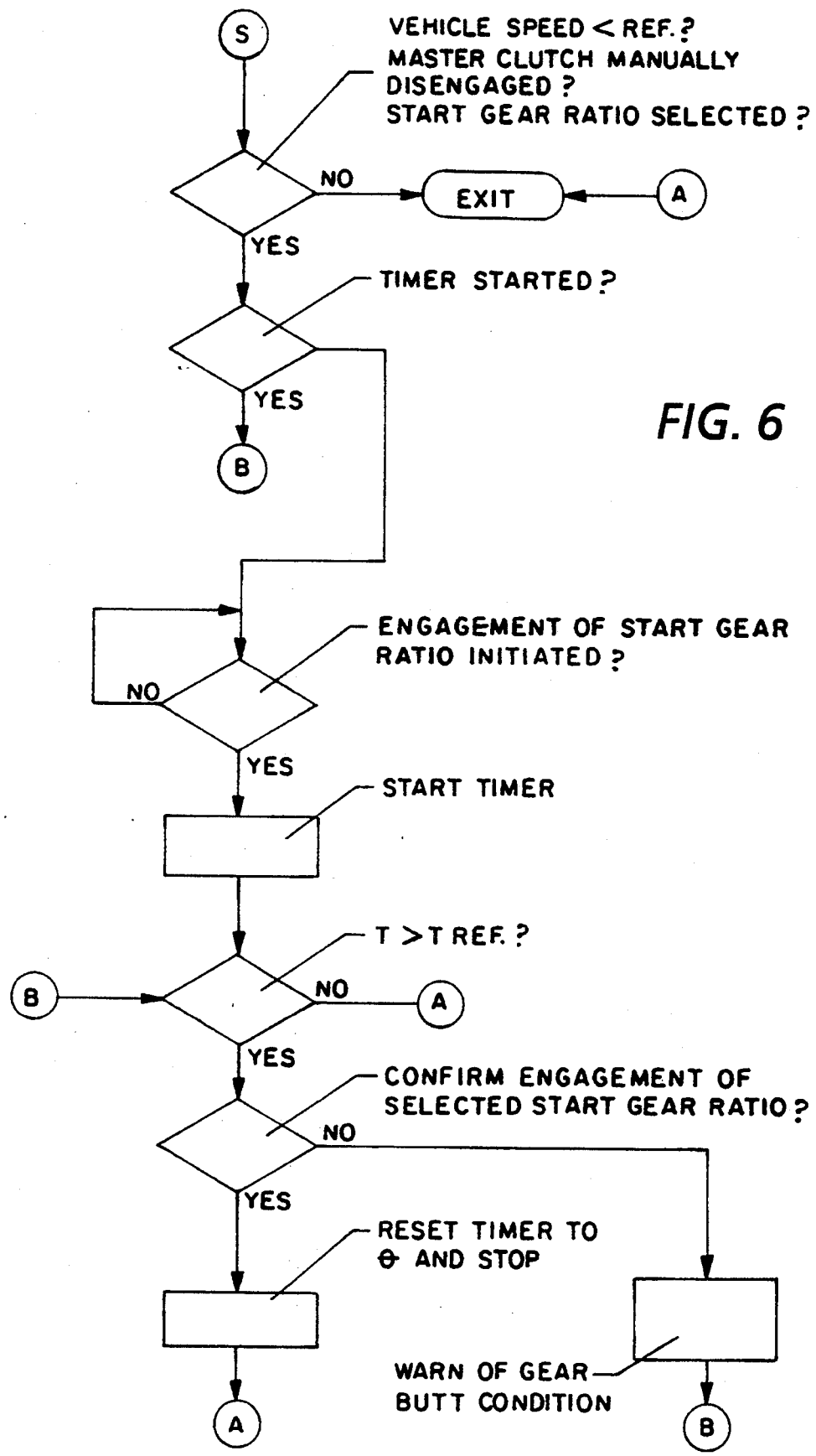

GEAR BUTT WARNING

BACKGROUND OF THE INVENTION

1. Field of the Invention

The present invention relates to a control system/method for controlling start from stop operations of a semi-automated mechanical transmission system of the type automatically implementing selected gear changes but requiring manual operation of the vehicle master clutch during start from stop operations.

2. Description of the Prior Art

Fully automated mechanical transmission systems are known in the prior art as may be seen by reference to U.S. Pat. Nos. 4,361,060 and 5,099,711, the disclosures of which are incorporated herein by reference.

Gear butt and/or gear buzz sensing control logic for fully automated mechanical transmission systems is known in the prior art as may be seen by reference to above-mentioned U.S. Pat. No. 5,099,711.

Fault tolerance logic routines for automatic and semi-automatic transmissions are known in the prior art as may be seen by reference to U.S. Pat. Nos. 4,922,425, 4,849,899 and 4,899,279, the disclosures of which are hereby incorporated by reference.

Semi-automated mechanical transmission systems which automatically implement selected shifts but require manual operation of the vehicle master clutch during start from stop operations are known in the prior art as may be seen by reference to U.S. Pat. Nos. 4,648,290; 4,888,577 and 5,042,327, the disclosures of which are incorporated herein by reference.

While such semi-automated mechanical transmission systems have been well received, they are not totally satisfactory as, under certain start from stop conditions, a gear butt condition may exist without knowledge thereof by the vehicle operator.

SUMMARY OF THE INVENTION

According to the present invention, the drawbacks of the prior art are minimized or overcome by the provision of a control system for a semi-automatic mechanical transmission of the type automatically implementing selected shifts and requiring manual master clutch start from stop operation which will sense a gear butt condition and will then warn the vehicle operator thereof so that corrective action may be taken.

The above is accomplished by sensing when a start gear engagement is initiated or commanded and sensing if, after a predetermined period of time, engagement of the start gear is not accomplished. Such sensing may involve sensing movement of a jaw clutch from its neutral position toward its engaged position but not sensing arrival at the engaged position and/or not sensing transmission input shaft and output shaft speeds indicative of jaw clutch engagement. If a gear butt condition is sensed, the operator is notified of the condition so that appropriate corrective actions, such as momentarily feathering the master clutch to knock the jaw clutch off its butting condition, may be manually initiated.

Accordingly, it is an object of the present invention to provide a new and improved control for a semi-automated mechanical transmission system of the type requiring manual master clutch operation during start from stop operations which, during stop from start operations, will sense for conditions indicative of a gear butt condition and will warn the operator thereof.

This and other objects and advantageous of the present invention will become apparent from a reading of the detailed description of the preferred embodiment taken in connection with the attached drawings.

DESCRIPTION OF THE DRAWINGS

FIG. 6 is a schematic illustration, in flow chart format, of the control logic of the present invention.

DESCRIPTION OF THE PREFERRED EMBODIMENT

Figure 1:
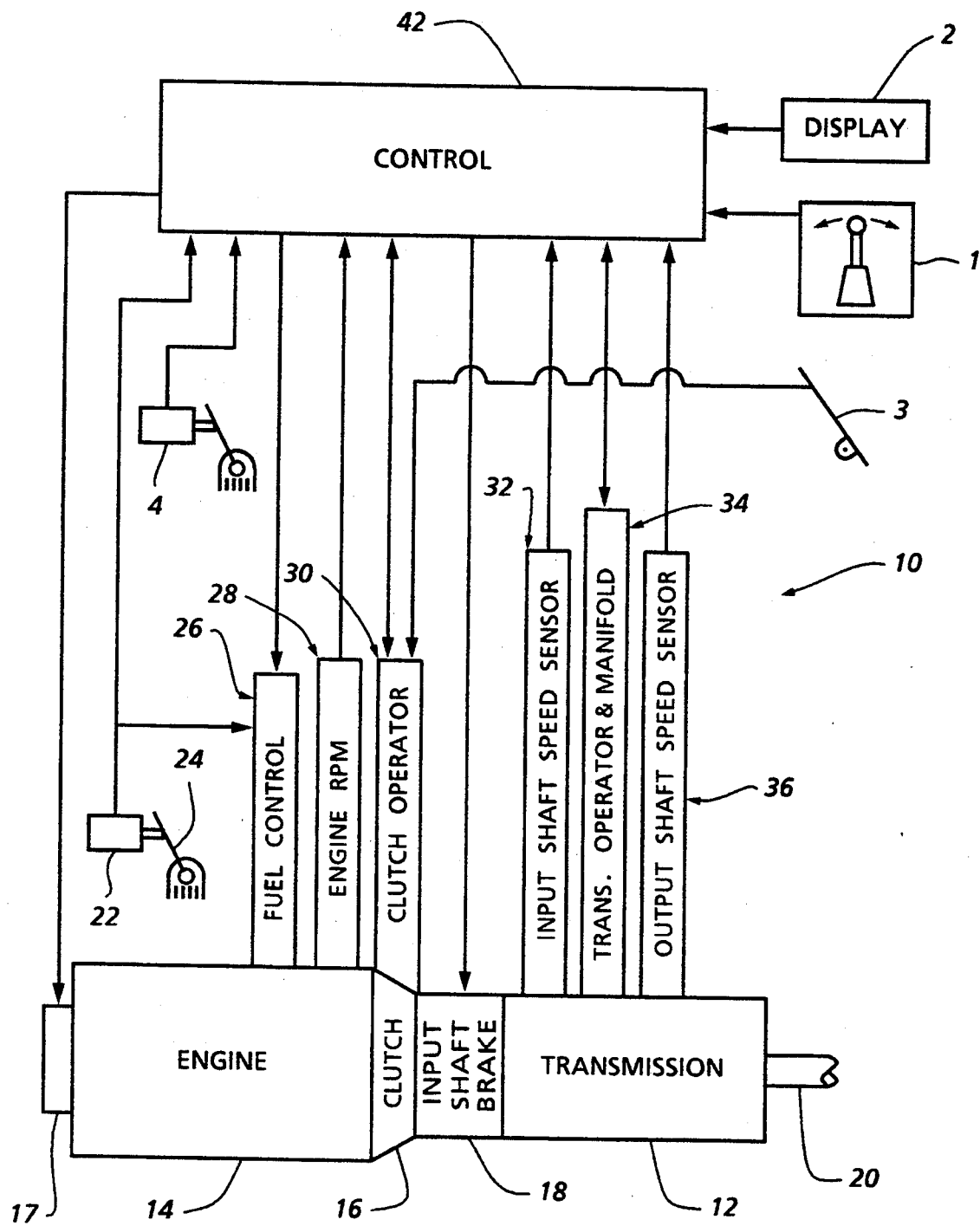
FIG. 1 is a symbolic illustration of a semi-automatic mechanical transmission system.

In the present description of the preferred embodiment, certain terminology will be used for descriptive purposes only and is not intended to be limiting. The terms "upward", "downward", "rightward" and "leftward" will refer to directions in the drawings to which reference is made. The terms "inward" and "outward", refer to directions towards and away from, respectively, the geometric center of the device, or portion thereof, being described. The above applies to derivatives of the terms above specifically mentioned, and terms of similar import.

The term "compound transmission" is used to designate a change speed transmission having a main transmission portion and an auxiliary transmission portion connected in series whereby the selected gear reduction in the main transmission portion may be compounded by further selected gear reduction in the auxiliary transmission portion. The term "splitter type compound transmission" as used herein will designate a compound transmission wherein the auxiliary transmission is used to provide various selectable steps for subdivisions of the gear ratio selected in the main transmission portion. In a splitter type compound transmission, the main transmission section is typically provided with relatively wide steps which are split or subdivided by the auxiliary section. The term "upshift" as used herein, shall mean the shifting from a lower speed gear ratio into a higher speed gear ratio.

The term "blocked transmission" or "blocked transmission section" shall designate a change gear constant mesh transmission or transmission section, wherein a selected one of a plurality of axially moveable gears is nonrotatably coupled to a shaft as a result of axial movement of the selected gear from the neutral to the engaged position thereof, and by means of a resiliently biased positive clutch and a blocker is utilized to prevent such engagement until the members of the positive clutch are at substantially synchronous rotation, such synchronous condition achieved by manual and/or automatic manipulation of the transmission input and-/or output shafts to cause a crossing of synchronous condition therebetween, but not typically achieved by frictional contact of the selected clutch members sufficient to cause one of the clutch members, and the apparatus associated therewith, to rotate with the other clutch member. Blocked transmissions and/or transmission sections are illustrated in U.S. Pat. Nos. 3,799,002; 3,924,484; 4,192,196 and 4,440,037, the disclosures of all of which are hereby incorporated by reference.

The semi-automatic control system of the present invention is particularly advantageously applied to a splitter type compound transmission of the type having a non-synchronized, non-blocked main transmission section connected in series with an auxiliary section of the blocked splitter type. Such transmissions are known in the prior art and are referred to as "semi-blocked" transmissions, and are described and illustrated in U.S. Pat. Nos. 4,735,109 and 4,736,643, the disclosures of which are hereby incorporated by reference.

The semi-automatic transmission system to which the present invention is particularly advantageously related, is described and illustrated in the above-mentioned U.S. Pat. Nos. 4,648,290, 4,888,577 and 5,042,327.

Referring to FIG. 1, the position of a driver-operated throttle 24 is sensed at sensor 22 and a signal indicative thereof (THD) fed to a central processing unit 38, which also receives inputs relative to engine speed from sensor 28 and/or transmission input shaft speed from sensor 32, transmission output shaft speed from sensor 36, and positive or negative actuations of the driver's gear shift lever 1, or "joy stick," to be described in greater detail below. It is understood that engine speed is an indication of transmission input shaft speed, and visa versa, especially if clutch 16 is nonslippingly engaged, while transmission output shaft speed is an indication of vehicle speed.

Devices, such as throttle position sensor assembly 22, for sensing the operators setting of a throttle pedal 24, or the like, and providing a signal proportional to, or at least indicative of, the monitored setting, and so called "remote fuel control" or "fly by wire" systems utilizing same, are known in the prior art and illustrated in the U.S. Pat. Nos. 4,250,845; 4,305,359; 4,319,658 and 4,461,254, the disclosures of which are hereby incorporated by reference.

Figure 2:
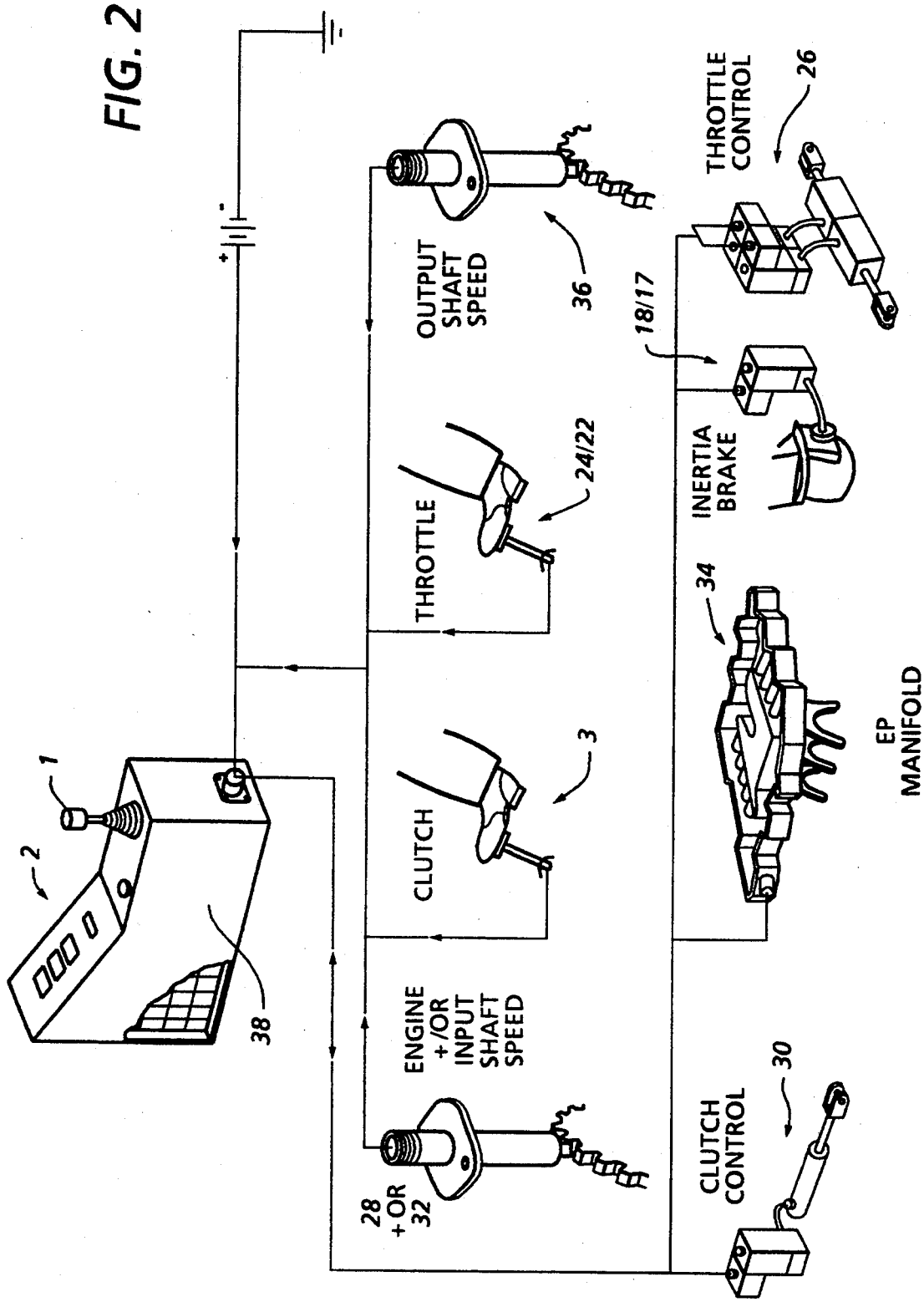
FIG. 2 is a symbolic illustration of control members and sensors of the system illustrated in FIG. 1.

Control logic circuits, sensors, and actuators for the transmission system 10 as disclosed in FIGS. 1 and 2, may be as disclosed in U.S. Pat. Nos. 4,361,060 and 4,595,986, the disclosures of which are hereby incorporated by reference. Specifically, central processing unit 38 receives inputs, processes same in accordance with predetermined logic rules, and provides command output signals to pneumatic and/or electrical actuators for control of an exhaust brake 17 and/or an input shaft brake 18 for rapid upshifts, and automatic fuel control 26 to "blip" the supply of fuel to the engine 14 to achieve rapid synchronous rotation preparatory to a downshift, clutch control via operator 30, and ratio shifting via transmission operator 34. The central processing unit also sends command output signals to the display 2 to be described in greater detail below. The automatic/semi-automatic transmission system 10 additionally comprises a usual foot operated manual clutch control 3 intended for use only for start from rest and/or low speed creeping maneuvering situations. The control 38 receives signals indicative of manual clutch control 3 position and of actuation of the vehicle brakes 4. The automatic/semi-automatic mechanical transmission system 10 also includes sources of electric and/or pneumatic power (not illustrated).

As used herein, the term "blip" designates a temporary increase in the supply of fuel to the engine 14, while the term "dip" means a momentary decrease in supply of fuel to the engine. The terms blip and dip are usually associated with automatic controller 38 commanded increases and decreases, respectively, of the supply of fuel to the engine independent of the operator selected position of manual throttle pedal 24.

Figure 3:
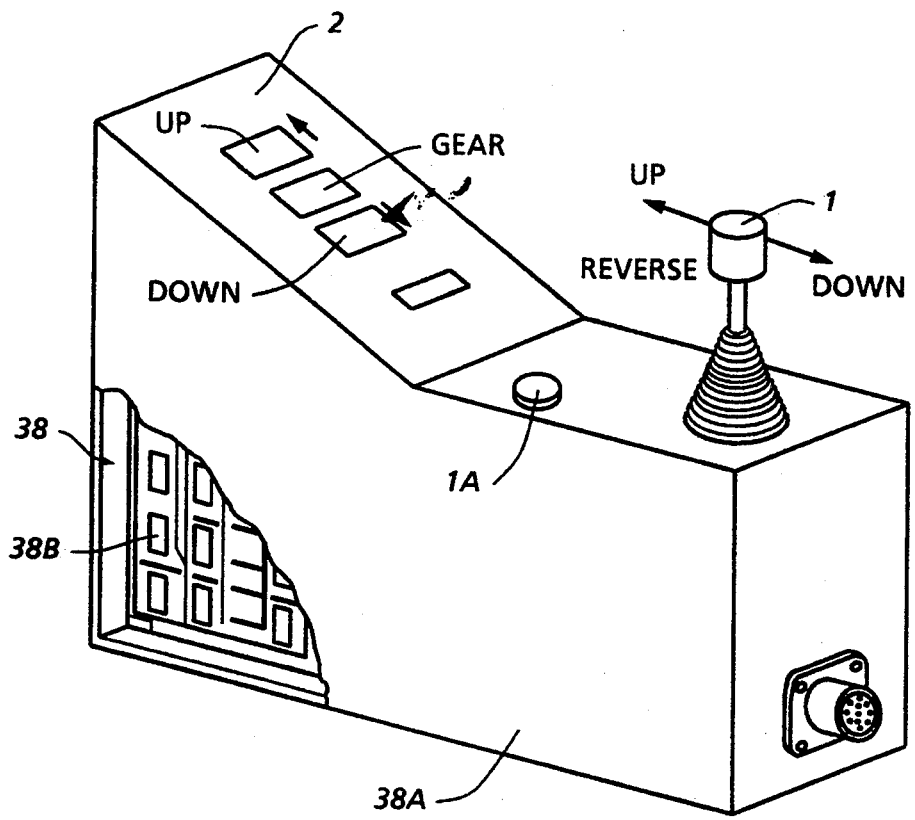
FIGS. 3 and 3B illustrate the control and display console of the system illustrated in FIG. 1.

Preferably, as may be seen by reference to FIG. 3, the central processing unit 38 may be contained in a box or housing 38A, which housing carries the display panel 2 having an upshift indicator display 2', a downshift indicator display 2", and a currently engaged gear ratio display 2''', the shift select lever 1, an optional reverse enable button 1A, as well as a central processing unit electronic circuitry 38B.

The schematics of the control system of the semi-automatic mechanical transmission system 10 are also illustrated in FIG. 2.

Figure 3B:
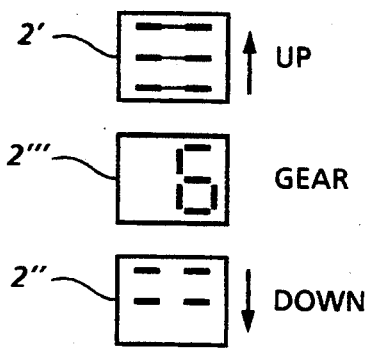
Figure 5:
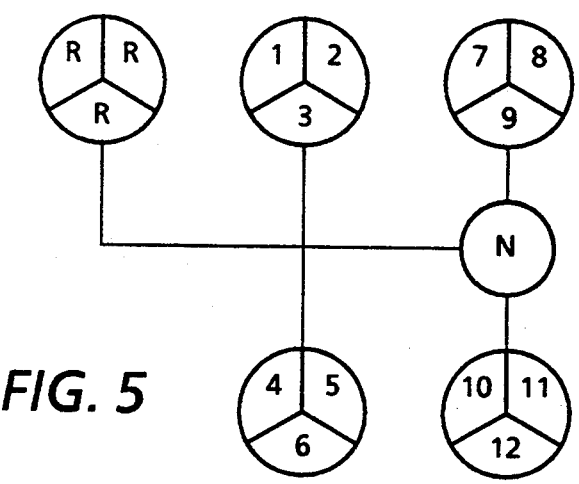
FIG. 5 illustrates the typical shift pattern for the transmission of FIG. 4.

Referring to FIG. 3B, the display 2 includes upshift indicator section 2', downshift indicator section 2" and currently engaged gear ratio indicator section 2'''. As illustrated, the currently engaged gear ratio display section 2''' is presently displaying a "6" indicating that the vehicle transmission is operating in sixth (6th) gear. The upshift display section 2' has three lines indicating the maximum number of permissible consecutive upshifts permitted according to the sensed input parameters, such as sensed engine or input shaft speed and sensed output shaft speed as processed according to the predetermined logic rules or program. In the present situation, the three lines indicate that a single, a double or a triple upshift is permissible. Accordingly, the driver may select a permissible shift directly to either seventh (7th), eighth (8th) or ninth (9th) speed. The downshift display 2" section has two lines indicating the maximum number of permissible consecutive downshifts permitted according to the sensed parameters as processed by the predetermined logic or program. In the present situation, the two lines in display 2' indicate that the transmission may be permissibly downshifted to either fifth (5th) or to fourth (4th) gear.

Briefly, the permissibility of a possible upshift or downshift is determined by comparing the expected engine speed at the completion of such an upshift or downshift, assuming a substantially constant vehicle speed and fully engaged master clutch, to a fixed range of maximum and minimum permissible engine speeds. The central processing unit 38 will not issue command signals to execute a selected impermissible ratio change. Preferably, a central processing unit will execute the closest permissible ratio change to that selected by the operator. By way of example, assuming the conditions indicated by display 2 as illustrated in FIG. 3B, should the operator select a downshift to third gear, such a downshift will not be executed by the central processing unit 38 as being impermissible. However, in the preferred embodiment, the central processing unit 38 will issue command output signals for a double downshift from sixth gear to fourth gear. Not only is an impermissible ratio change refused, but the driver will usually have been advised already by display 2 that the ratio should never have been attempted or selected.

The display 2 provides an indication to the operator what upshifts and downshifts are permitable and as to which upshifts and downshifts are impermissible. Should the driver not heed the warning, the central processing unit 38 will not generate impermissible shift command even though synchronization of the mechanical jaw clutch elements could be obtained by the system.

When the upshift indication display 2' is blank, no upshift is allowed and the driver is probably driving at a very low economical engine RPM. Conversely, when the downshift indicator 2' is blank, i.e. has no horizontal lines displayed therein, no downshift is allowable, and maximum torque, acceleration or hill climbing will probably already be available in the system in its current engaged gear ratio. Gear shifts are always achieved without the operator manually engaging and/or disengaging the master clutch 16 by means of the mechanical manual clutch pedal 3, which is normally only used for starting from rest, reversing or for maneuvering in warehouses, etc., as vehicle clutches have traditionally been used.

To shift transmission 12, the driver moves lever 1 forward (for upshifts) and rearward (for downshifts) from the position illustrated in FIGS. 2 and 3. To select a single upshift, i.e. a shift to seventh gear, the operator will move lever 1 forward once and the lever will then return to the neutral or centered position under bias. If, in sixth gear as shown, the operator moves the lever forward three times in quick succession, each allowing its return to rest, he will skip two gears in effect, and achieve a skip shift directly into ninth speed (i.e. seventh and eighth speeds will not be engaged) almost instantaneously. Accordingly, multiple or skip shifts may be commanded by use of the semi-automatic control of the present invention. The declutching of the master clutch 16 and synchronizing of the selected jaw clutch members associated with the selected gear ratio is achieved automatically and rapidly due to automatic throttle and clutch control and braking of the input shaft and/or the engine. The control system is semi-automatic and the driver must exercise his discretion as to when to up or downshift, and as to how many gear ratios to up or downshift, but is not called upon to coordinate gear lever, throttle pedal and clutch actuation. Once the driver has selected a permitted gear ratio, the throttle is blipped to achieve necessary synchronization during a downshift, or dipped for achieving necessary synchronization during an upshift, all of which is done automatically for the driver by the central processing unit 38. The reverse mode of operation may be achieved only from the neutral at rest position and then is achieved by moving control lever 1 backwardly from the currently engaged neutral position. To prevent and inadvertent "downshift" into reverse, a reverse button 1A may be provided which button must be depressed prior to the central processing unit interpreting a backward movement of the control lever 1 when in the neutral position as a request for reverse operation.

When the vehicle comes to rest from above a predetermined vehicle speed, and the operator manually disengages the vehicle master clutch, the control logic will interpret a single displacement of lever 1 in the downshift direction as an operator selection of a direct shift into a predetermined start gear ratio and will issue the necessary command output signals to implement such a shift.

Preferably, transmission 12 is a multi-speed transmission having at least five, preferably nine or more, selectable forward ratios. The structure of a twelve forward speed splitter type transmission 12, and of the blocked jaw clutch members utilized in the auxiliary transmission section of transmission 12, is known in the prior art and may be appreciated in greater detail by reference to above mentioned U.S. Pat. Nos. 3,799,002 and 4,735,109.

The transmission includes an input shaft 218 supported adjacent its rearward end by a bearing 220 and is provided with an input gear 222 nonrotatably connected thereto, as by splines. The input gear 222 simultaneously drives a plurality of main section countershafts at equal speeds. In the illustrated embodiment, the transmission is provided with two main section countershafts, 224 and 226, disposed on diametrically opposite sides of the mainshaft 228, which mainshaft is coaxially aligned with the input shaft 218 and is provided with a pilot portion 230 on its forward end rotatably received within and supported by the rearward end of the input shaft 218.

The input shaft 218 is normally driven in one direction only by a prime mover, such as a throttle controlled Diesel engine E through a selectively operated, normally engaged, friction master clutch C. Clutch C may be selectively disengaged by use of pedal P as is known in the prior art. Clutch C may have a known clutch-brake associated therewith.

Each of the main section countershafts 224 and 226 is provided with an identical grouping of countershaft gears, such as the pair of gears 236, of identical size and number of teeth and disposed on diametrically opposite sides of the mainshaft 228. As may be seen by reference to FIG. 2, countershaft gears 242 and 244 may be defined by involute splines formed directly on the main section countershafts.

A plurality of main section mainshaft drive gears 246, 248, 250 and 252 surround the mainshaft 228 and are selectably clutchable thereto, one at a time, by sliding clutch collars as is well known in the art.

The main section mainshaft gears 246, 248 and 250 encircle the mainshaft 228, are in continuous meshing engagement with, and are floatingly supported by the diametrically opposite pairs of countershaft gears, 238, 240 and 242, respectively, which mounting means and the special advantages resulting therefrom are explained in greater detail in U.S. Pat. Nos. 3,105,395 and 3,335,616, the disclosures of which are hereby incorporated by reference. The mainshaft gear 252 is the reverse gear and is in continuous meshing engagement with a pair of countershaft gears 244 by means of conventional intermediate idler gears (not shown). The forwardmost countershaft gears 236 are continually meshed with and driven by the input gear 222 for causing simultaneous rotation of the countershafts 224 and 226 whenever the input shaft is rotatably driven.

Main section mainshaft gears 246, 248, 250 and 252; and main section countershaft gears 236, 238, 240, 242 and 244, and the idler gears, are all constantly meshed with and driven by the input gear 222 and thus, in combination, form the input gearing of the transmission 12.

As may be seen, various abutment rings 254 are provided to axially fix the main section mainshaft gears relative to mainshaft 228.

Sliding clutch collars 256, 258 and 260 are splined to mainshaft 228 for axial movement relative thereto and rotation therewith as is well known in the art.

Sliding clutch 256 is axially slidable by means of shift fork 262 to clutch gear 252 to the mainshaft. Sliding clutch 258 is axially slidable by means of shift fork 264 to clutch either gear 250 or 248 to the mainshaft. Sliding clutch 260 is axially slidable by means of shift fork 264 to clutch gear 246 to the mainshaft or to clutch the input gear 222 (and thus the input shaft 218) to the mainshaft. Shift forks 262, 264 and 266 are attached to shift bars or rails of a known shift bar housing assembly.

Considering now the splitter auxiliary section 214, the mainshaft 228 extends thereinto and is coaxially arranged with and piloted into an output shaft 274 which is in turn supported within the housing 216 by suitable bearings generally indicated at 276. Said auxiliary section further includes a plurality of auxiliary section countershafts 278 and 280 each having an identical grouping of countershaft gears 284, 286 and 288 therein.

As is known in the art and is illustrated in above-mentioned U.S. Pat. No. 3,105,395, to minimize the axial and transverse dimensions of a twin countershaft type compound transmission, the mainshaft section countershafts, 224 and 226, are displaced about 90° from the auxiliary section countershafts. Main section countershafts are supported in housing 216 by bearings 290 and 292 while auxiliary section countershafts, 278 and 280, are supported in housing 216 by bearings 294 and 296.

Two auxiliary section mainshaft gears, 308 and 310, encircle the mainshaft 228 and are constantly meshed with and floatingly supported by the auxiliary countershaft gear pairs 284 and 286, respectively. Output gear 312 is splined to output shaft 274 for axial movement relative thereto and rotational movement therewith. Output gear 312 is constantly meshed with auxiliary countershaft gear pair 288.

Resiliently biased clutch members 316, 318 and 320 are splined to mainshaft 228 and, in combination with blockers (not shown) provide resilient, blocked clutching apparatus of the type described in above-mentioned U.S. Pat. Nos. 3,799,002, 3,921,469 and 3,924,484 for selectively clutching gears 308, 310 and 312, respectively, one at a time, to mainshaft 228. Clutch 316 is biased axially by spring 330 and limited in its axial movement by positive stop 334. Clutch members 318 and 320 are biased axially apart by spring 336 surrounding the mainshaft and limited in axial movement by stops 338 and 340.

Gear 312 is axially moved by shift fork 342 and gears 308 and 310 are joined for joint axial movement and independent rotation by ring 346 and are axially movable by shift fork 348. Gears 308, 310 or 312 are selectively engaged, one at a time, to mainshaft 228. Of course, engagement of gear 312 to the mainshaft 228 is effective to couple mainshaft 228 directly to the output shaft 274.

With semi-automated mechanical transmission systems of the type described, i.e. derived from a manual nonsynchronized mechanical transmission, the conditions of tooth butting, i.e. the ends of the teeth of the jaw clutch members coming into abutment rather than axial interengagement and/or tooth buzzing, i.e., the ends of the butted jaw clutch teeth going into a grinding relative rotation rather than into axial interengagement as one of the clutch members is to rapidly rotate to overcome butting, may occur at vehicle start from stop conditions. In such transmission systems, it is desirable to provide logic routines for detecting tooth butt or tooth buzz conditions and to warn the vehicle operator thereof so that appropriate correct actions may be undertaken.

Figure 4:
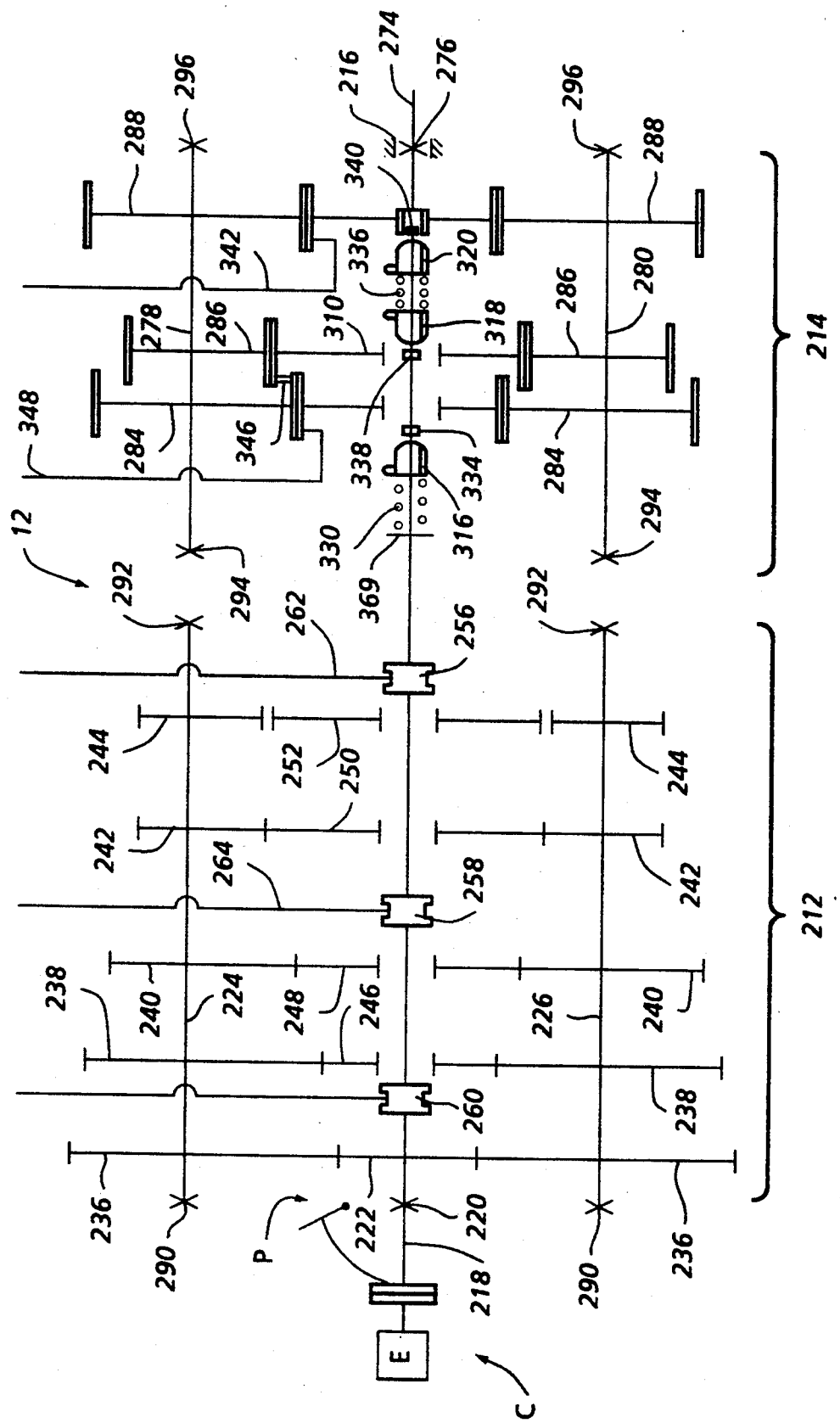
FIG. 4 is a symbolic illustration of a "4×3" twelve speed compound splitter type semi-blocked transmission.

As is well known, the various jaw clutches, 256, 258 and 260 have a first nondisplaced axial position as shown in FIG. 4 and at least one second fully displaced axial position wherein the selected gear is rotationally coupled to the mainshaft 228. The axial position of the jaw clutches are usually monitored by monitoring shift fork/shift rail position. Such sensors are well known in the prior art as may be seen by reference to U.S. Pat. Nos. 4,676,115 and 4,945,484, the disclosures of which are incorporated by reference.

According to the control system/method of the present invention, as schematically illustrated in flow chart format in FIG. 6, at vehicle start from stop conditions, when the master clutch is manually disengaged, if greater than a reference time ($T_{REF}$), such as, for example, 0.5 to 1.5 seconds, elapses from shift into start gear ratio initiation until sensing conditions indicate of start gear ratio engagement (such as sensing full axial displacement of the associated jaw clutch/shift fork/shift rail), then a gear butt condition is determined to exist and the vehicle operator is warned.

Preferably, the warning will continue for so long as conditions indicative of a gear butt continue to exist and the warning will be displayed on the display 2, such as by flashing the number of the engaging start gear in section 2''' until the gear is sensed as fully engaged.

Upon receiving the warning of a gear butt condition, if the operator will "feather" the master clutch, i.e., quickly partially apply, then quickly release the master clutch, this is usually sufficient to knock the jaw clutch teeth off the butt and allow full engagement of the involved jaw clutch.

Accordingly, it may be seen that the present invention provides a control system/method for controlling the start from stop operations of semi-automated mechanical transmission systems of the type automatically implementing selected gear ratio changes and requiring manual operation of the vehicle master clutch for start from stop operations, which will sense conditions indicative of gear butt conditions during a start from stop operation and will warn the vehicle operator thereof.

Although the preferred embodiment of the present invention has been described with a certain degree of particularity, various changes to form and detail may be made without departing from the spirit and scope of the invention as hereinafter claimed.

We claim:

1. A control method for controlling start from stop operations of a vehicular semi-automated mechanical transmission system (10) of the type comprising a multiple speed change gear mechanical transmission (12) utilizing selectively engaged and disengaged positive jaw clutches (256, 258, 260) to engage and disengage selected speed ratios, a master friction clutch (16) drivingly interposed the transmission and a prime mover (14), a central processing unit (38) for receiving inputs indicative of (i) master friction clutch engaged and disengaged condition, (ii) transmission jaw clutch engaged and disengaged condition and (iii) vehicle speed and for processing same according to predetermined logic rules to issue command output signals to a (i) transmission operator (34) and, (ii) a signal device (2) and a manual clutch operator (3) effective during at least start from stop conditions, said method characterized by:

sensing conditions indicative of vehicle start from stop conditions including (i) vehicle speed below a predetermined reference value (REF), (ii) selection of a start gear ratio and (iii) manual disengagement of said master friction clutch, sensing initiation of engagement of said selected start gear ratio by one of said jaw clutches beginning to move from fully disengaged towards an engaged condition, and if engagement of said one of said jaw clutches is not sensed within a predetermined period of time after initiation of engagement of said selected start gear ratio, causing said signal device to signal the existence of a gear butt condition.

2. The method of claim 1 wherein each of said jaw clutches includes a first clutch member (256, 258, 260) having a first axial position (FIG. 4) corresponding to a fully disengaged condition of said jaw clutch and a second axial position, axially displaced from said first axial position, corresponding to a fully engaged position of said jaw clutch, said signals indicative of jaw clutch engaged and disengaged condition comprising signals indicative of the axial position of said clutches.

3. The method of claim 1 wherein said predetermined period of time is about 0.5 to 1.5 seconds.

4. The method of claim 1 wherein said transmission includes an input shaft (218) and an output shaft (274) and said input signals indicative of the engaged and disengaged condition of said jaw clutches include signals indicative of input shaft and output shaft rotational speeds.

5. The method of claim 2 wherein said transmission includes an input shaft (218) and an output shaft (274) and said input signals indicative of the engaged and disengaged condition of said jaw clutches include signals indicative of input shaft and output shaft rotational speeds.

6. The method of claim 1 wherein said system includes a display (2''') for displaying a symbol indicative of the selected start gear ratio, said signal indicative of the existence of a gear butt condition comprising flashing said symbol indicative of the selected start gear ratio.

7. The method of claim 2 wherein said system includes a display (2''') for displaying a symbol indicative of the selected start gear ratio, said signal indicative of the existence of a gear butt condition comprising flashing said symbol indicative of the selected start gear ratio.

8. The method of claim 1 wherein said central processing unit issues command output signals to a master clutch operator (30) not effective during vehicular start from stop conditions.

9. The method of claim 2 wherein said central processing unit issues command output signals to a master clutch operator (30) not effective during vehicular start from stop conditions.

10. A control system for controlling start from stop operations of a vehicular semi-automated mechanical transmission system (10) of the type comprising a multiple speed change gear mechanical transmission (12) utilizing selectively engaged and disengaged positive jaw clutches (256, 258, 260) to engage and disengage selected speed ratios, a master friction clutch (16) drivingly interposed the transmission and a prime mover (14), a central processing unit (38) for receiving inputs indicative of (i) master friction clutch engaged and disengaged condition, (ii) transmission jaw clutch engaged and disengaged condition and (iii) vehicle speed and for processing same according to predetermined logic rules to issue command output signals to a (i) transmission operator (34) and (ii) a signal device (2) and a manual clutch operator (3) effective during at least start from stop conditions, said control system characterized by:

means for sensing conditions indicative of vehicle start from stop conditions including (i) vehicle speed below a predetermined reference value (REF), (ii) selection of a start gear ratio and in manual disengagement of said master friction clutch, means for sensing initiations of engagement of said selected start gear ratio by sensing one of said jaw clutches starting to move from a fully disengaged towards an engaged condition, and means effective if engagement of said one of said jaw clutches is not sensed within a period of predetermined time after initiation of engagement of said selected start gear ratio for causing said signal device to signal the existence of a gear butt condition.

11. The system of claim 10 wherein each of said jaw clutches includes a first clutch member (256, 258, 260) having a first axial position (FIG. 4) corresponding to a fully disengaged condition of said jaw clutch and a second axial position, axially displaced from said first axial position, corresponding to a fully engaged position of said jaw clutch, said signals indicative of jaw clutch engaged and disengaged condition comprising signals indicative of the axial position of said clutches.

12. The system of claim 10 wherein said predetermined period of time is about 0.5 to 1.5 seconds.

13. The system of claim 10 wherein said transmission includes an input shaft (218) and an output shaft (274) and said input signals indicative of the engaged and disengaged condition of said jaw clutches include signals indicative of input shaft and output shaft rotational speeds.

14. The system of claim 11 wherein said transmission includes an input shaft (218) and an output shaft (274) and said input signals indicative of the engaged and disengaged condition of said jaw clutches include signals indicative of input shaft and output shaft rotational speeds.

15. The system of claim 10 wherein said system includes a display (2''') for displaying a symbol indicative of the selected start gear ratio, said signal indicative of the existence of a gear butt condition comprising flashing said symbol indicative of the selected start gear ratio.

16. The method of claim 9 wherein said system includes a display (2''') for displaying a symbol indicative of the selected start gear ratio, said signal indicative of the existence of a gear butt condition comprising flashing said symbol indicative of the selected start gear ratio.

17. The system of claim 10 wherein said central processing unit issues command output signals to a master clutch operator (30) not effective during vehicular start from stop conditions.

18. The system of claim 11 wherein said central processing unit issues command output signals to a master clutch operator (30) not effective during vehicular start from stop conditions.

* * * * *